(12) United States Patent
Chang

(10) Patent No.: US 11,076,273 B2
(45) Date of Patent: Jul. 27, 2021

(54) SYSTEMS AND METHODS FOR CONTROLLING DATA TRANSFER IN A NETWORK OF MOVING THINGS, FOR EXAMPLE INCLUDING AUTONOMOUS VEHICLES

(71) Applicant: Veniam, Inc., Mountain View, CA (US)

(72) Inventor: John Renchun Chang, Oporto (PT)

(73) Assignee: VENIAM, INC., Mountain View, CA (US)

( * ) Notice: Subject to any disclaimer, the term of this patent is extended or adjusted under 35 U.S.C. 154(b) by 0 days.

(21) Appl. No.: 15/901,345

(22) Filed: Feb. 21, 2018

(65) Prior Publication Data

US 2019/0045336 A1   Feb. 7, 2019

Related U.S. Application Data

(60) Provisional application No. 62/541,892, filed on Aug. 7, 2017.

(51) Int. Cl.
*H04W 4/40* (2018.01)
*H04W 88/10* (2009.01)
*H04W 84/12* (2009.01)

(52) U.S. Cl.
CPC .......... *H04W 4/40* (2018.02); *H04W 84/12* (2013.01); *H04W 88/10* (2013.01)

(58) Field of Classification Search
CPC ...... H04L 67/12; H04W 48/005; H04W 4/40; H04W 4/44; H04W 4/046; H04W 4/46; G08G 1/0112; G08G 1/0965; G08G 1/096791; B60R 16/023; G05D 2201/0213; H04B 1/3822; Y02D 70/142
See application file for complete search history.

(56) References Cited

U.S. PATENT DOCUMENTS

| | | | | |
|---|---|---|---|---|
| 2009/0170475 | A1* | 7/2009 | Ch'ng | H04W 12/02 455/411 |
| 2015/0222708 | A1* | 8/2015 | Addepalli | H04W 4/046 709/217 |
| 2016/0198016 | A1* | 7/2016 | Tiger | H04L 47/823 709/213 |
| 2017/0208632 | A1* | 7/2017 | Gunasekara | H04W 76/10 |
| 2017/0372623 | A1* | 12/2017 | Srivastav | G06Q 30/0283 |
| 2019/0090174 | A1 | 3/2019 | Rocci et al. | |

* cited by examiner

*Primary Examiner* — Elton Williams
(74) *Attorney, Agent, or Firm* — McAndrews, Held & Malloy, Ltd.

(57) ABSTRACT

Communication network architectures, systems and methods for supporting and/or effectively utilizing a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network, or one or more nodes thereof, implemented in accordance with various aspects of the present disclosure provide for controlling data transfer through a network of moving things in a manner that reduces unnecessarily utilization of communication bandwidth and/ or financial resources.

24 Claims, 14 Drawing Sheets

SYSTEMS AND METHODS FOR CONTROLLING DATA TRANSFER IN A NETWORK OF MOVING THINGS, FOR EXAMPLE INCLUDING AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/541,892, filed on Aug. 7, 2017, and titled "Systems and Methods for Controlling Data Transfer in a Network of Moving Things, for example Including Autonomous Vehicles," which is hereby incorporated herein by reference in its entirety.

This patent application is related to U.S. patent application Ser. No. 15/633,201, filed on Jun. 26, 2017, and titled "Systems and Methods for Multi-path Delay Tolerant Communication in a Network of Moving Things, For Example Including a Network of Autonomous Vehicles," which is a continuation of U.S. patent application Ser. No. 15/353,966, filed on Nov. 17, 2016, and titled "Systems and Methods for Delay Tolerant Networking in a Network of Moving Things, For Example Including a Network of Autonomous Vehicles," now U.S. Pat. No 9,693,297, which makes reference to, claims priority to, and claims benefit from U.S. Provisional Application Ser. No. 62/257,421, filed on Nov. 19, 2015, and titled "Systems and Methods for Delay Tolerant Networking in a Network of Moving Things," each of which is hereby incorporated herein by reference in its entirety.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015 and U.S. patent application Ser. No. 15/245,992, titled "Systems and Methods for Shipping Management in a Network of Moving Things," filed Aug. 26, 2016; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). For example, in a vehicle communication system in which the mobile access points of vehicles autonomously determine the manner in which data is communicated through the communication network, a substantial amount of data may be unnecessarily communicated (e.g., resulting in wasted communication network bandwidth, inefficient energy utilization, over-utilization of processing and/or memory resources during time periods in which such resources may be better utilized elsewhere, etc.) and/or unnecessarily communicated in a manner that is more expensive than necessary. Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
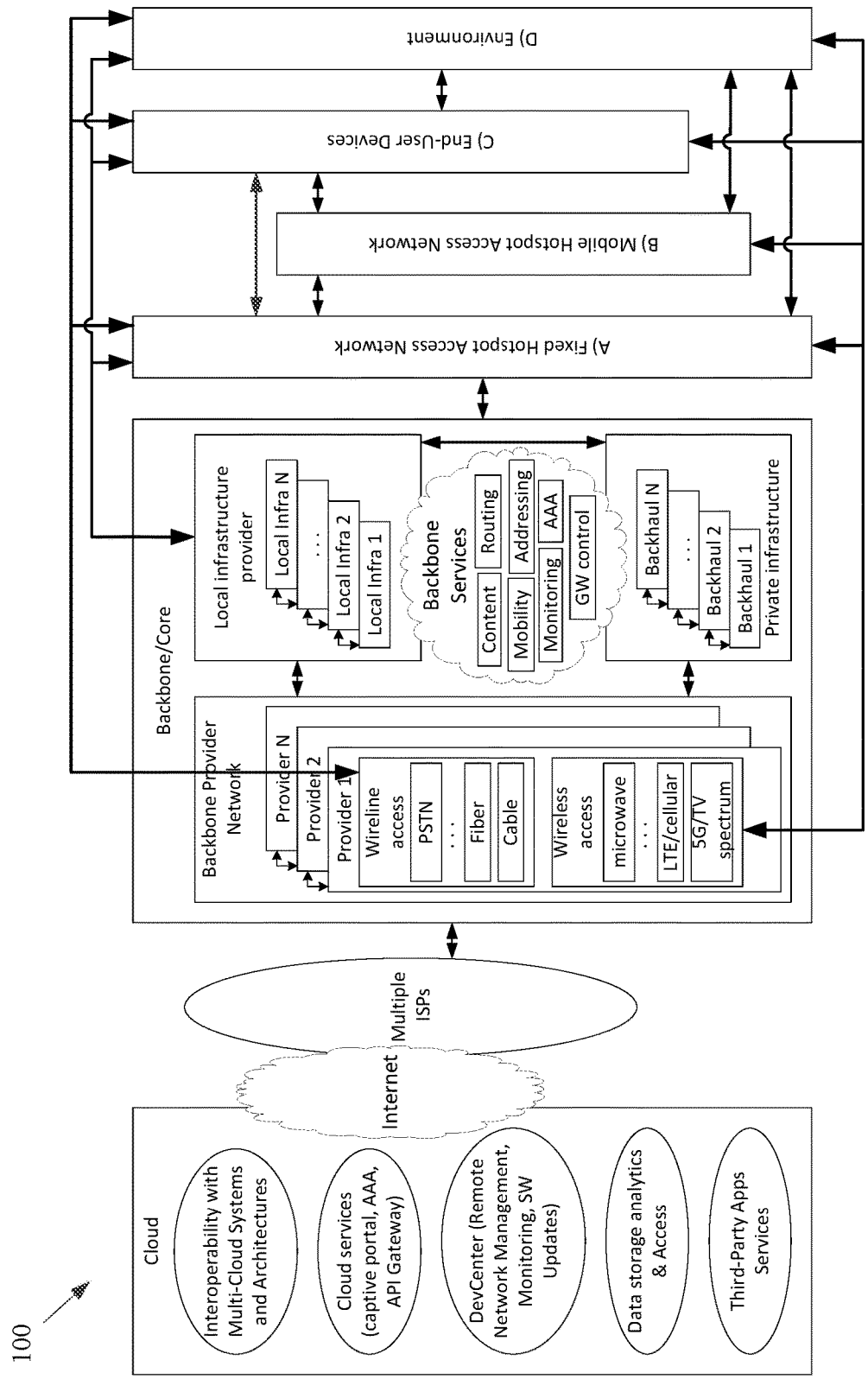
FIG. 1 shows a block diagram of a communication network, in accordance with various aspects of this disclosure.

Various aspects of this disclosure provide communication network architectures, systems and methods for supporting and/or effectively utilizing a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network, or one or more nodes thereof, implemented in accordance with various aspects of the present disclosure provide for controlling data transfer through a network of moving things in a manner that reduces unnecessarily utilization of communication bandwidth, energy resources, processor and memory resources, and/or financial resources.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, air freight hub, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 (and/or network components) may, for example, share any or all characteristics with the other example networks (and/or network components) and methods (and/or method steps) 200, 300, 400, 500-570, 600, 700, 800, 900, 1000, 1100, 1200, 1300, 1400, and 1500, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
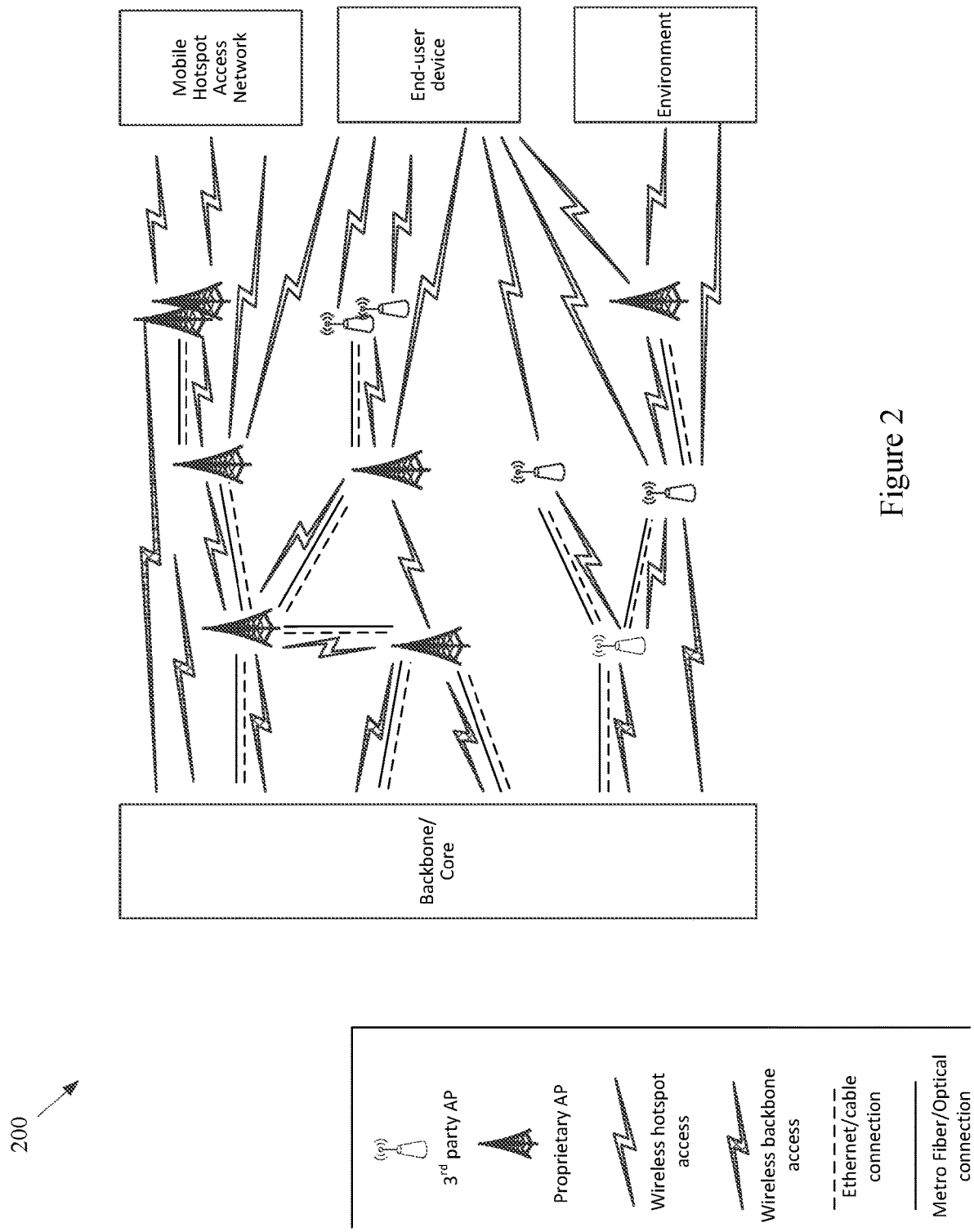
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks (and/or network components) and methods (and/or method steps) 100, 300, 400, 500-570, 600, 700, 800, 900, 1000, 1100, 1200, 1300, 1400, and 1500, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
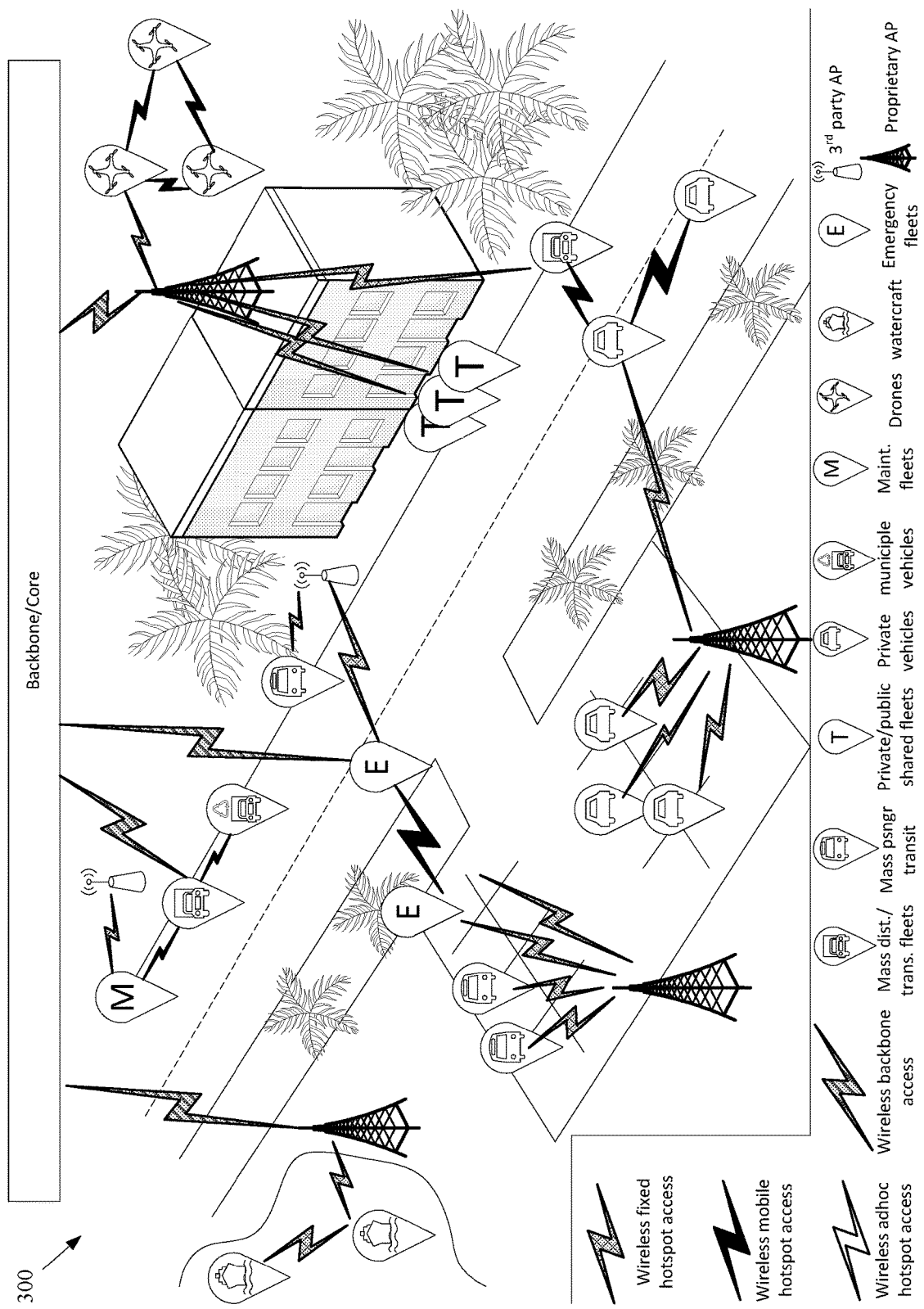
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks (and/or network components) and methods (and/or method steps) 100, 200, 400, 500-570, 600, 700, 800, 900, 1000, 1100, 1200, 1300, 1400, and 1500, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
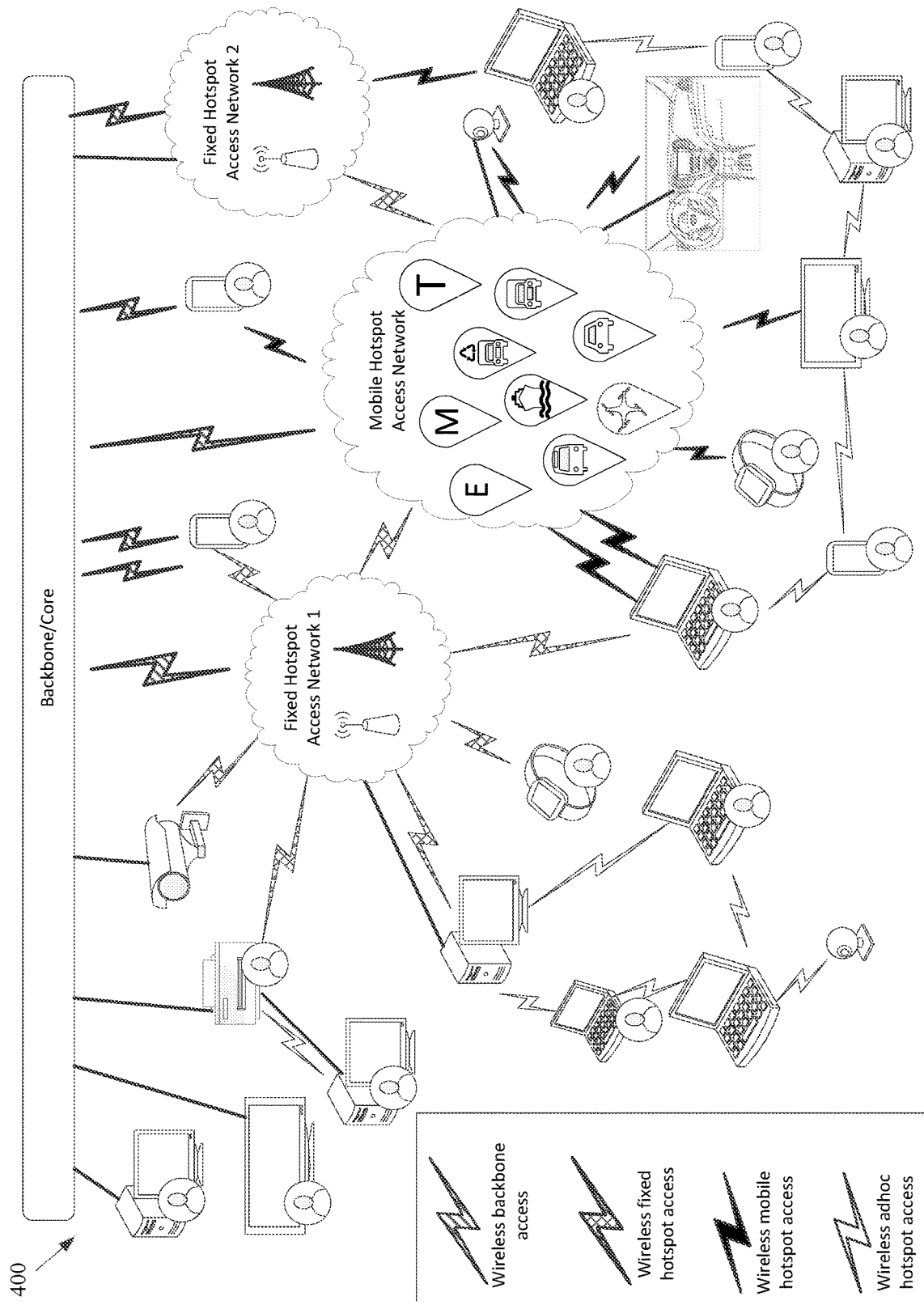
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks (and/or network components) and methods (and/or method steps) 100, 200, 300, 500-570, 600, 700, 800, 900, 1000, 1100, 1200, 1300, 1400, and 1500, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
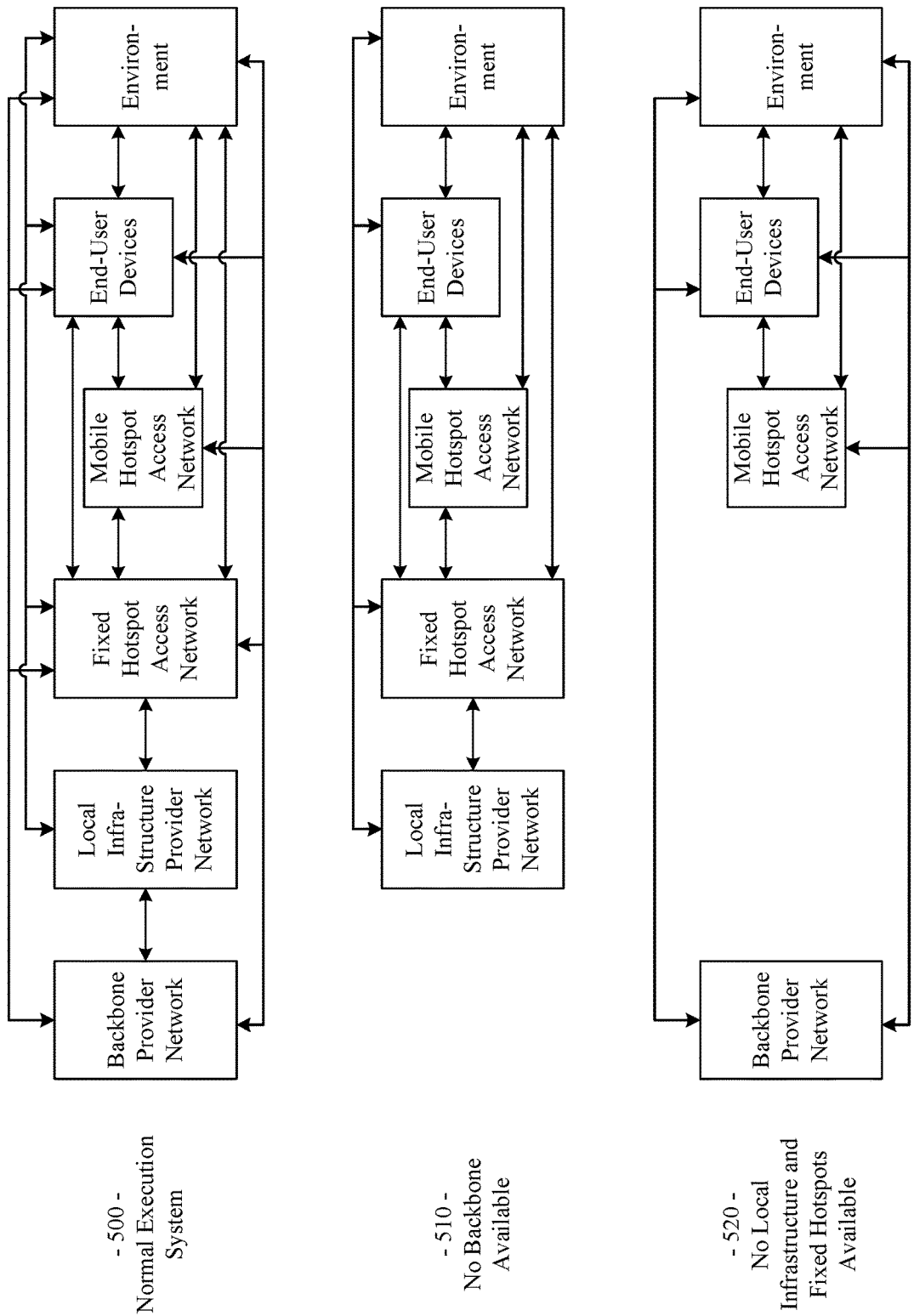
FIGS. 5A-5C show a plurality of network configurations illustrating the flexibility and/or and resiliency of a communication network, in accordance with various aspects of this disclosure.
Figure 5B:
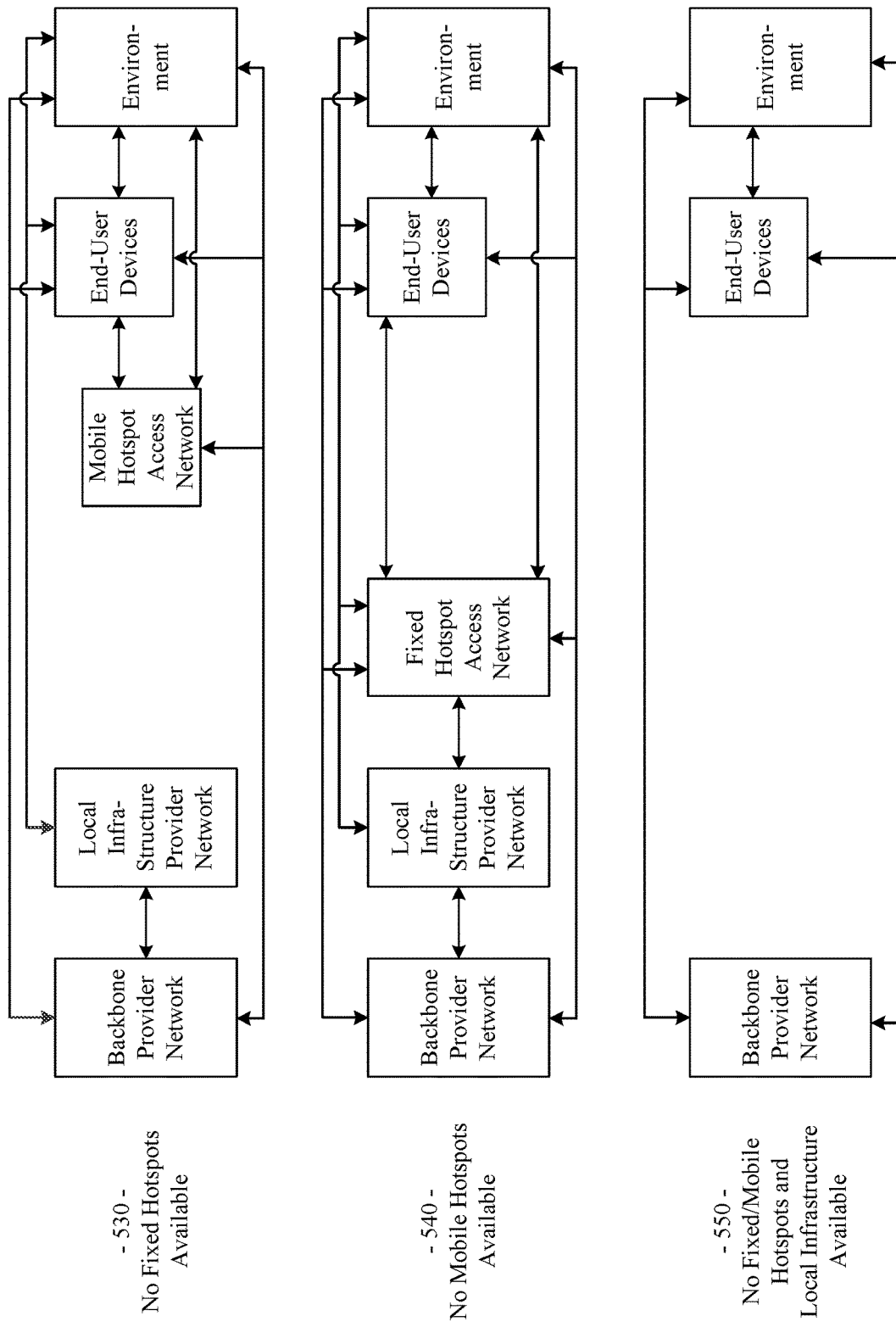
Figure 5C:
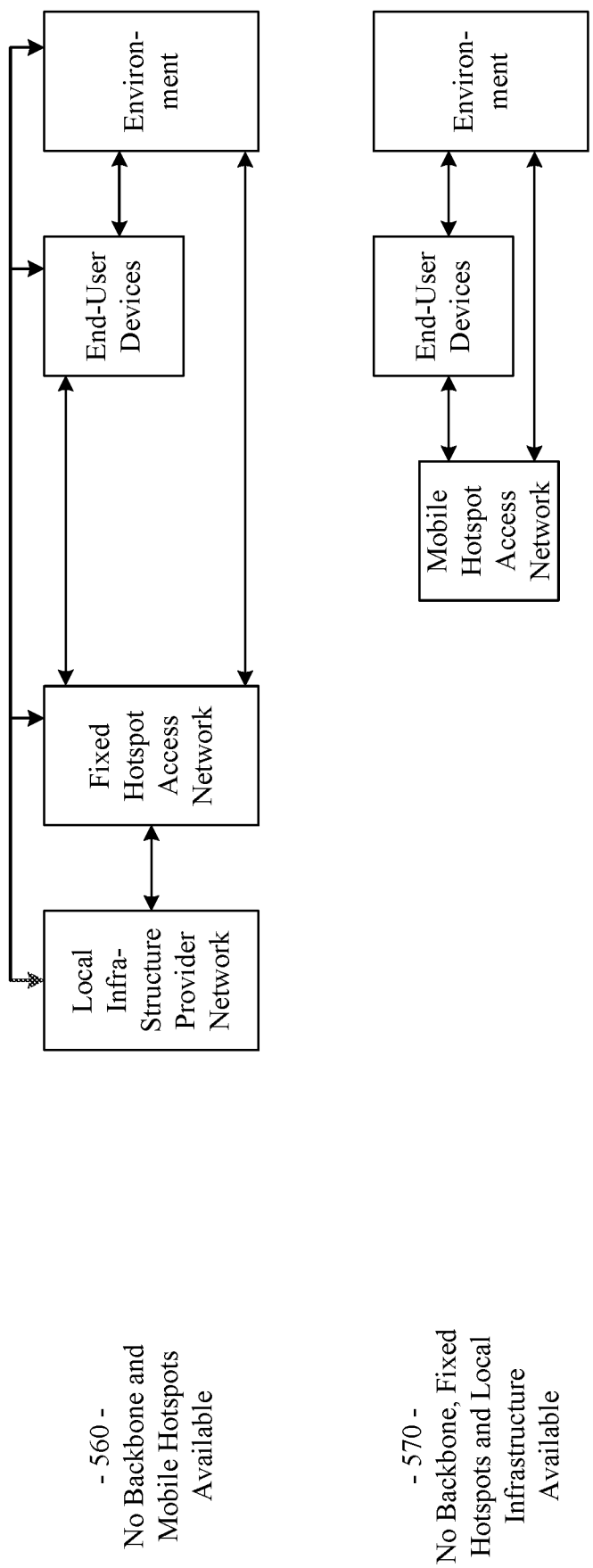

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks (and/or network components) and methods (and/or method steps) 100, 200, 300, 400, 600, 700, 800, 900, 1000, 1100, 1200, 1300, 1400, and 1500, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
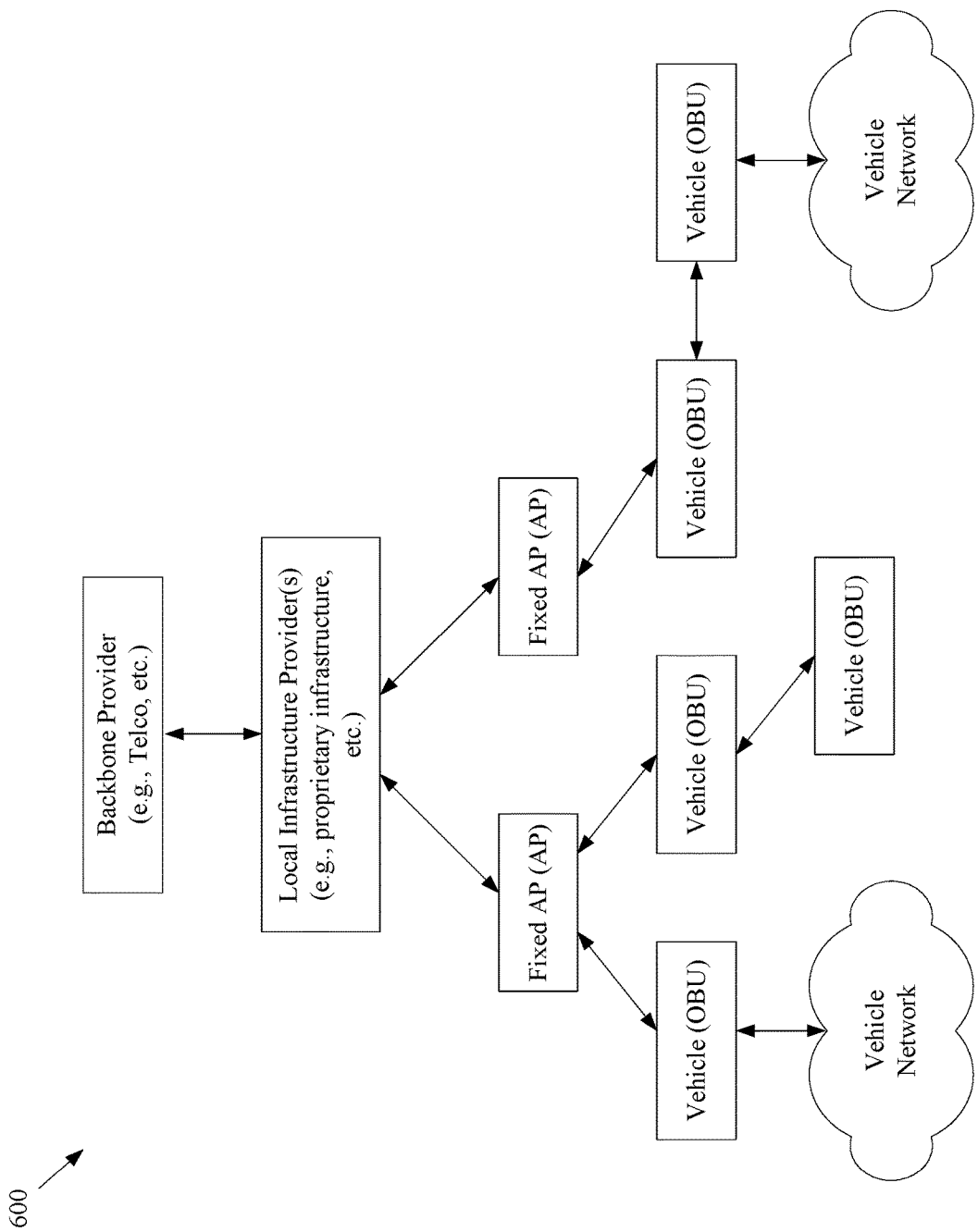
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks (and/or network components) and methods (and/or method steps) 100, 200, 300, 400, 500-570, 700, 800, 900, 1000, 1100, 1200, 1300, 1400, and 1500, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
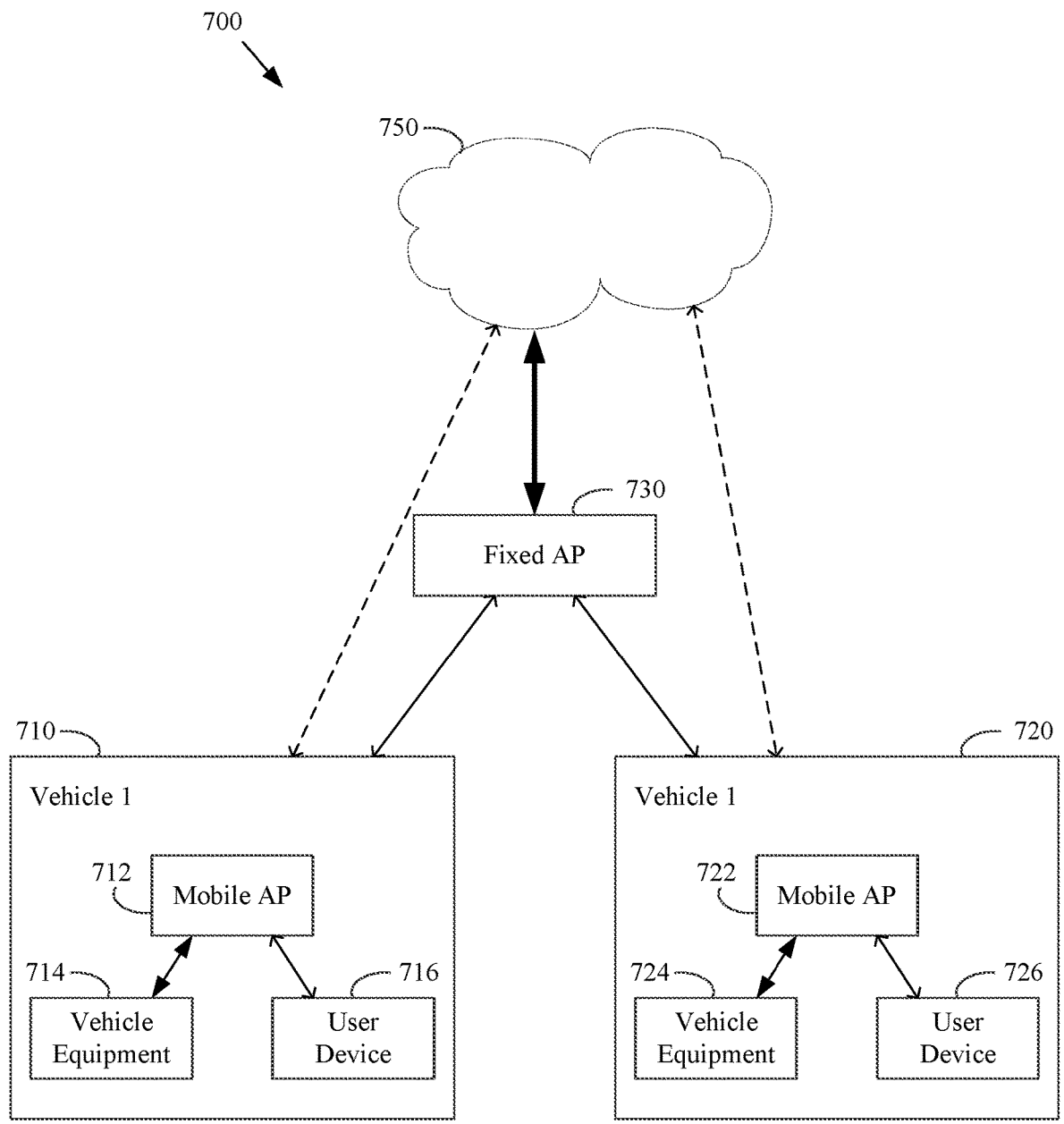
FIG. 7 shows various aspects of an example system and method for data transfer in a vehicle communication network, in accordance with various aspects of the present disclosure.

FIG. 7 shows various aspects of an example system and method for data transfer in a vehicle communication network, in accordance with various aspects of the present disclosure. The example system 700 and method of FIG. 7 may, for example, share any or all characteristics with the other example networks (and/or network components) and methods (and/or method steps) 100, 200, 300, 400, 500-570, 600, 800, 900, 1000, 1100, 1200, 1300, 1400, and 1500, discussed herein.

In general, a network of moving things may comprise any one or more of the following: Mobile APs (or OBUs), which may for example be installed in or on vehicles; Fixed APs (or RSUs), which may for example be stationary (e.g., attached to buildings, mounted to towers, etc.); and any of a variety of Internet (or Cloud) servers.

The example system 700 shown in FIG. 7, comprises a Fixed AP 730 that is communicatively coupled to the Cloud 750, for example via any of a variety of communication network backbones, many examples of which are provided herein. The example system 700 also includes a first vehicle 710 and a second vehicle 720. The first vehicle 710 comprises a first Mobile AP 712 that communicates data with first equipment 714 of the first vehicle 710 and with a first user device 716 in or around the vehicle 710. The first Mobile AP 712 also, for example, communicates first sensor data with first sensors in or around the first vehicle 710 (e.g., on-board the vehicle or off-board). The first Mobile AP 712 is communicatively coupled with the Fixed AP 730 via a wireless communication link (e.g., a DSRC link, etc.) and communicatively coupled to the Cloud 750 via one or more other communication links (e.g., a cellular link, etc.). Similarly, the second vehicle 720 comprises a second Mobile AP 722 that communicates data with second equipment 724 of the vehicle 720 and with a second user device 726 in or around the vehicle 720. The second Mobile AP 722 also, for example, communicates second sensor data with second sensors in or around the second vehicle 720 (e.g., on-board the vehicle or off-board). The second Mobile AP 722 is communicatively coupled with the Fixed AP 730 with a wireless communication link (e.g., a DSRC link, etc.) and communicatively coupled to the Cloud 750 via one or more other communication links (e.g., a cellular link, etc.). Note that the first Mobile AP 712 and the second Mobile AP 722 are also communicatively coupled to the Cloud 750 via the Fixed AP 730.

The Fixed AP 730 may, for example, be connected to the Cloud 750 via wired communication links and/or wireless communication links. In an example scenario, when a Mobile AP 712/722 comes within range of a Fixed AP 730, a wireless communication link (e.g., a DSRC link, a Wi-Fi link, etc.) can be established between the two nodes. In this way, the Mobile AP 712/722 can connect to the Cloud 750 via this relatively inexpensive (e.g., low time, low power, low monetary cost, etc.) wireless link. Mobile APs 712/722 can also establish wireless links (e.g., wireless LAN links, DSRC links, etc.) with other Mobile APs, forming a vehicle mesh network, allowing data to be sent to a Fixed AP 730 via one or more intermediate Mobile APs. When, however, there is no Fixed AP within range (e.g., directly within range or indirectly within range via one or more intermediate Mobile APs), the Mobile AP 712/722 may connect to the Cloud 750 via a relatively expensive communication link (e.g., a cellular communication network link, a satellite communication network link, etc.).

During an example operating scenario, there may be data to be communicated from the vehicles 710/720 to the Cloud 750. The Mobile APs 712/722 may generate (or originate) this data, or other equipment on (or near) the vehicle (e.g., vehicle control systems, vehicle sensors, on-board diagnostic (OBD) system, passenger devices (e.g., mobile phones, smart phones, navigation devices, health monitoring devices, on-person sensors, smart watches, etc.), off-vehicle sensors, etc.) may generate (or originate) this data. The data to be communicated from (or to) the vehicles may, for example, include amounts and/or types of data that, prior to the advent and growth of vehicle communication networks and/or the Internet of moving things, were relatively insubstantial. For example, the proliferation of vehicles with Mobile APs providing wireless LAN services to users, providing communication links between a central controller and vehicle navigation systems and/or OBD systems, collecting sensor data from stationary sensors by which a Mobile AP is passing, providing multi-hop communication links to other Mobile APs, etc., results in vehicle communication network demands that were previous unheard of.

It may, for example, be desirable to optimize network utilization by transferring data (e.g., always, during periods of relatively high network utilization, etc.) in an intelligent manner. Such intelligent communication may, for example, provide for a relatively high degree of scalability, cost savings, network performance improvement, etc.

An example intelligent communication strategy may, for example, differentiate between real-time data (e.g., operational/control communication, emergency communication, time-sensitive data, etc.) and delay-tolerant data (e.g., event logs, non-critical updates, non-time-critical sensor data, etc.). For example, delay-tolerant data may be queued and communicated opportunistically over a wireless LAN link when such a link is available, thereby minimizing the use of cellular links, which generally incur a higher time and monetary cost. In a non-limiting example implementation, this strategy may be characterized as "push with delay-tolerant capability," where data is "pushed" from vehicle to Cloud (e.g., from the point-of-view of the Mobile AP), for example asynchronously.

Various examples of such intelligent operation may, for example, be found in U.S. patent application Ser. No. 15/633,201, filed on Jun. 26, 2017, and titled "Systems and Methods for Multi-path Delay Tolerant Communication in a Network of Moving Things, For Example Including a Network of Autonomous Vehicles," which is a continuation of U.S. patent application Ser. No. 15/353,966, filed on Nov. 17, 2016, and titled "Systems and Methods for Delay Tolerant Networking in a Network of Moving Things, For Example Including a Network of Autonomous Vehicles," now U.S. Pat. No. 9,693,297, which makes reference to, claims priority to, and claims benefit from U.S. Provisional Application Ser. No. 62/257,421, filed on Nov. 19, 2015, and titled "Systems and Methods for Delay Tolerant Networking in a Network of Moving Things," each of which is hereby incorporated herein by reference in its entirety for all purposes.

A "push" strategy may, for example, effectively reduce the cost of data communication between vehicles (or Mobile APs thereof) and the Cloud. However, a "push" strategy alone may have various disadvantages. For example, in an example implementation in which the rules for data management and transport reside on the vehicle, the type and rate of data to be sent may be statically defined, for example defined in configuration files or hard-coded in firmware. As a result, a substantial amount of the data that is transferred may have little or no value, or may for example be communicated in real-time with little or no real-time value. Also, a real-time need may occur for particular data at higher resolution and/or at higher data rates than normally sent from the vehicle, and thus the data may be communicated slower than desired and/or at a lower resolution then desired.

Accordingly, there are opportunities for alternative systems and methods for controlling data transfer in a network of moving things, for example, incorporating a strategy in which the intelligence (or a portion thereof) for data management and transport reside in the Cloud, rather than in the vehicle. Such strategies may be characterized as "pull" strategies, for example in which the Cloud "pulls" data from the Mobile AP (e.g., from the point-of-view of the Mobile AP). As will be discussed herein, various strategies may also incorporate push/pull hybrid strategies.

Systems and methods implemented in accordance with various aspects of this disclosure provide a solution for optimizing network (e.g., vehicle network, etc.) utilization by providing the means for an external program running on another node (e.g., a Cloud server or computer, a Mobile AP, a Fixed AP, a Network Controller (NC), etc.) to specify the type and rate of data that is sent from a vehicle (e.g., a Mobile AP thereof). For example, rather than unconditionally sending data that is generated on or at the vehicle, and rather than sending such data in accordance with rules that are static at the vehicle, data may be stored on the Mobile AP, for example subject to a data retention policy. In an example implementation, the data might be only sent upon request via a control mechanism. Such a control mechanism may be implemented in any of a variety of manners, non-limiting examples of which are provided herein.

For example, a control mechanism may operate over a cellular link (e.g., a persistent cellular link, etc.), for example generally utilizing the cellular link only for low-bandwidth signaling data, where the small overhead may be offset by the total cost savings that can be achieved by the efficient data communication provided. Note, however, that the control mechanism may be implemented over any of a variety of types of communication links, for example any of the types of communication links discussed herein, etc. In an example implementation, a REpresentational State Transfer (REST) API, for example implemented utilizing HTTP, may be utilized.

Various example control mechanisms (or strategies) provided herein may be characterized as "pull" strategies, but the scope of this disclosure is not limited thereof. For example, many push/pull hybrid solutions are also provided herein, in which for example, pull and push strategies are integrated in single comprehensive solutions, for example in which various push and/or pull aspects are configurable with or without direct user interaction.

Figure 8:
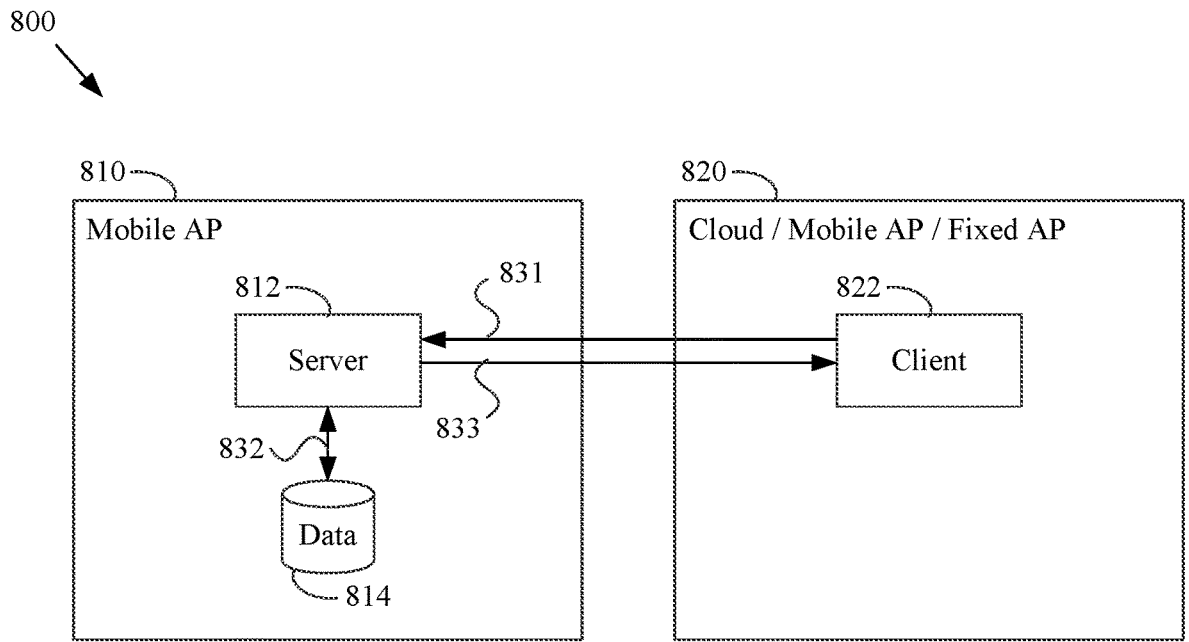
FIG. 8 shows various aspects of an example system and method for pull-based data transfer in a vehicle communication network, in accordance with various aspects of the present disclosure.

FIG. 8 shows various aspects of an example system and method for pull-based data transfer in a vehicle communication network, in accordance with various aspects of the present disclosure. The example system and method of FIG. 8 may, for example, share any or all characteristics with the other example networks (and/or network components) and methods (and/or method steps) 100, 200, 300, 400, 500-570, 600, 700, 900, 1000, 1100, 1200, 1300, 1400, and 1500, discussed herein.

FIG. 8 shows an example pull strategy comprising a query engine. The example system 800 (and method) comprises a Mobile AP 810 and another node 820 (e.g., a Cloud server or computer, another Mobile AP, a Fixed AP, a Network Controller (NC), a network dashboard, a personal communication device, etc.). The Mobile AP 810 comprises a Server module 812 (e.g., a processor operating in accordance with software instructions stored in a memory, for example a non-transitory memory, a non-volatile memory, etc.) and a database 814 (e.g., a nonvolatile memory on-board the Mobile AP 810, etc.).

In an example implementation, the Server module 812 provides an interface via which other nodes may access data stored at the database 814 of the Mobile AP 810. For example, the Client module 822 (e.g., a processor operating in accordance with software instructions stored in a memory, for example a non-transitory memory, etc.) of the other node 820 may send a request 831 (or command) to the Server module 812. In response to the request 831, the server module 812 communicates with the database 814 over a communication link 832 of the Mobile AP 810 to obtain the requested data. The Server module 812 may then communicate the requested data to the Client module 822 of the other node 820 in a response message 833 (or response data stream, etc.). Note that the request message 833 may include information about the desired manner (e.g., format, resolution, protocol, etc.) in which the Server module 812 is to communicate the requested data to the Client module 822.

As discussed herein, the request message 831 and/or the response message 833 may be communicated over any of a variety of types of communication links, and may each be communicated over different respective types of communication links. For example, the request message 831 may be communicated over a persistent (or non-persistent) cellular link, while the response message 833 may be communicated over various vehicle communication network links (e.g., DSRC links, Wi-Fi links, etc.), opportunistically over hotspot (e.g., Wi-Fi hotspot) links, non-persistent or persistent cellular links, etc. Also for example, the request message 831 may be communicated via various vehicle communication network links (e.g., DSRC links, optical links, etc.), while the response message 833 may be communicated via various vehicle communication network links (e.g., DSRC links, optical links, etc.), a dedicated cellular link, an immediately available Wi-Fi hotspot link, etc.

Note that the request message 831 may specify any of a variety of parameters (e.g., identifying the data, specifying a duration (or time window) over which the data is to be communicated, specifying maximum allowable latency for communication of the data, specifying resolution of the data, specifying a periodicity at which the data is to be communicated, specifying an urgency or priority of the data, specifying communication protocol(s) and/or communication network pathways to be utilized when communicating the data, specifying security communication parameters to be utilized when communicating the data, etc.).

Figure 9:
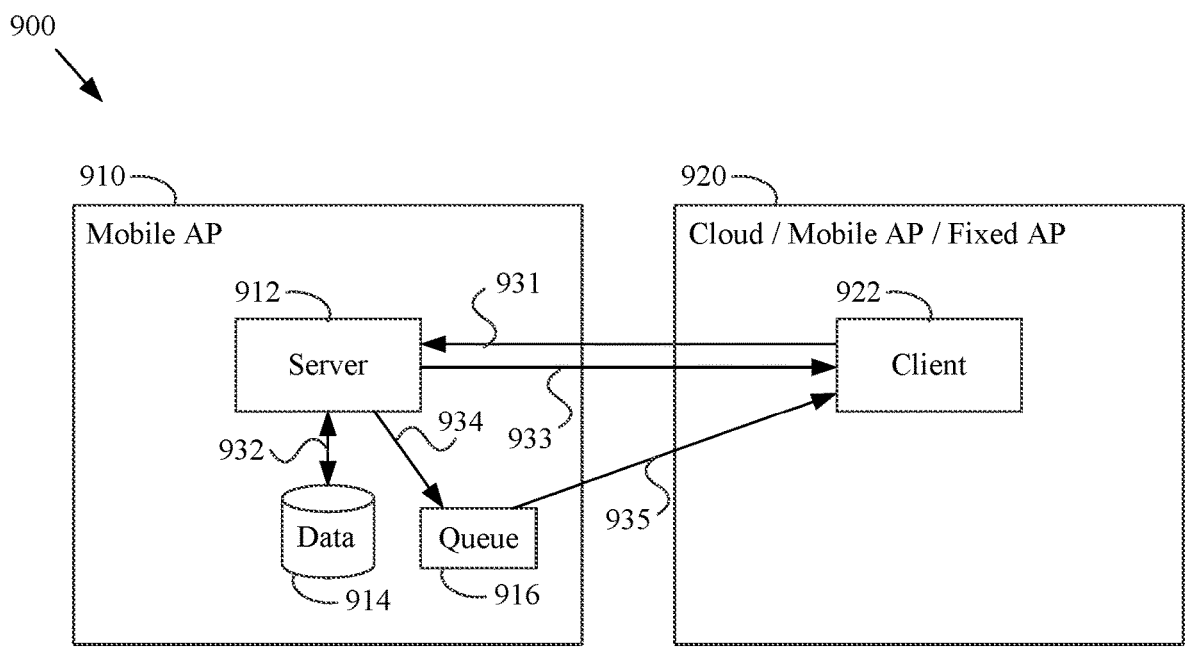
FIG. 9 shows various aspects of an example system and method for pull-based data transfer, for example including real-time and delay-tolerant networking, through a vehicle communication network, in accordance with various aspects of the present disclosure.

In another example implementation, the Client module 822 may specify the urgency of the request. In response, the Server module 812 may communicate the requested data back to the Client module 822 in the appropriate manner, for example the cheapest manner that still meets delivery requirements specified by the Client module 822. For example, the Server module 812 may respond to the Client module 822 with the requested data synchronously (e.g., immediately in real-time) and/or synchronously (e.g., opportunistically in a delay-tolerant manner, etc.). FIG. 9 illustrates an example implementation.

FIG. 9 shows various aspects of an example system and method for pull-based data transfer, for example including real-time and delay-tolerant networking, through a vehicle communication network, in accordance with various aspects of the present disclosure. The example system and method of FIG. 9 may, for example, share any or all characteristics with the other example networks (and/or network components) and methods (and/or method steps) 100, 200, 300, 400, 500-570, 600, 700, 800, 1000, 1100, 1200, 1300, 1400, and 1500, discussed herein.

The example implementation 900 shown in FIG. 9 shares many aspects with the example implementation 800 shown in FIG. 8. For example, the Mobile AP 910 and other node 920 of FIG. 9 may share any or all characteristics with the Mobile AP 810 and other node 820 of FIG. 8. For example, the Server module 912, database 914, and Client module 922 of FIG. 9 may share any or all characteristics with the Server module 812, database 814, and Client module 822 of FIG. 8. Also for example, the request message 931 and response message 933 of FIG. 9 may share any or all characteristics with the request message 831 and response message 833 of FIG. 8.

As discussed herein, the request 931 communicated by the Client module 922 to the Server module 912 may specify urgency (and/or priority) and/or the manner in which the Client module 922 wants the Server module 912 to communicate the requested data back to the Client module 922. The example Mobile AP 910 comprises a Queue module 916 for queuing delay-tolerant delivery of requested data from the Mobile AP 910 to the other node 920 (e.g., to the Client module 922 thereof).

For example, in a first scenario, the Client module 922 may communicate a request message 931 to the Server module 912 for the immediate communication of time-sensitive data (e.g., emergency data, vehicle control data, etc.) back to the Client module 922 (and/or to another specified destination). In response, the Server module 912 may retrieve the requested data from the database 914 (or solicit the requested data from a source device of the requested data, for example from a vehicle navigation system, from a vehicle OBD system, from an on-board sensor, from a stationary sensor by which the Mobile AP has passed or will pass, etc.) and immediately communicate the retrieved data back to the Client module 922 via a response message 933 (e.g., over a cellular link, over a reliable high-priority vehicle communication network link, etc.).

In a second scenario, the Client module 922 may communicate a request 931 to the Server module 912 for the delay-tolerant communication of non-time-critical data (e.g., general performance metric information, general vehicle operational data, general vehicle status information, wireless link utilization metrics, passenger loading information, information from non-critical stationary sensors by which the Mobile AP has passed or will be passing, etc.) back to the Client module 922 (and/or to another specified destination). In response, the Server module 912 may retrieve the requested data from the database 914 (or solicit the requested data from a source device of the requested data, for example from a vehicle navigation system, from a vehicle OBD system, from an on-board sensor, from a stationary sensor by which the Mobile AP has passed or will pass, etc.) and place the retrieved data in a Queue 916 for delay-tolerant communication back to the Client module 922 (or other indicated destination module), for example in a response message 935 to be communicated over an opportunistic communication link.

Thus, at any given time, the Mobile AP 910 may be providing real-time communication of first requested data to the other node 920 (or another destination) upon request, while at the same time waiting for the circumstances to occur for the opportunistic communication of second requested data to the other node 920 (or another destination). Note that the real-time communication of the first requested data and the opportunistic communication of the second requested data may be to the same destination or to different respective destinations. In an example implementation, both the real-time communicated data and the delay-tolerant communication data may be in response to a solicitation for such data. Note, however, that as discussed herein, data may additionally be communicated in an unsolicited manner.

Another example implementation may, for example, comprise the utilization of a publish/subscribe technique. An example 1000 is shown in FIG. 10.

Figure 10:
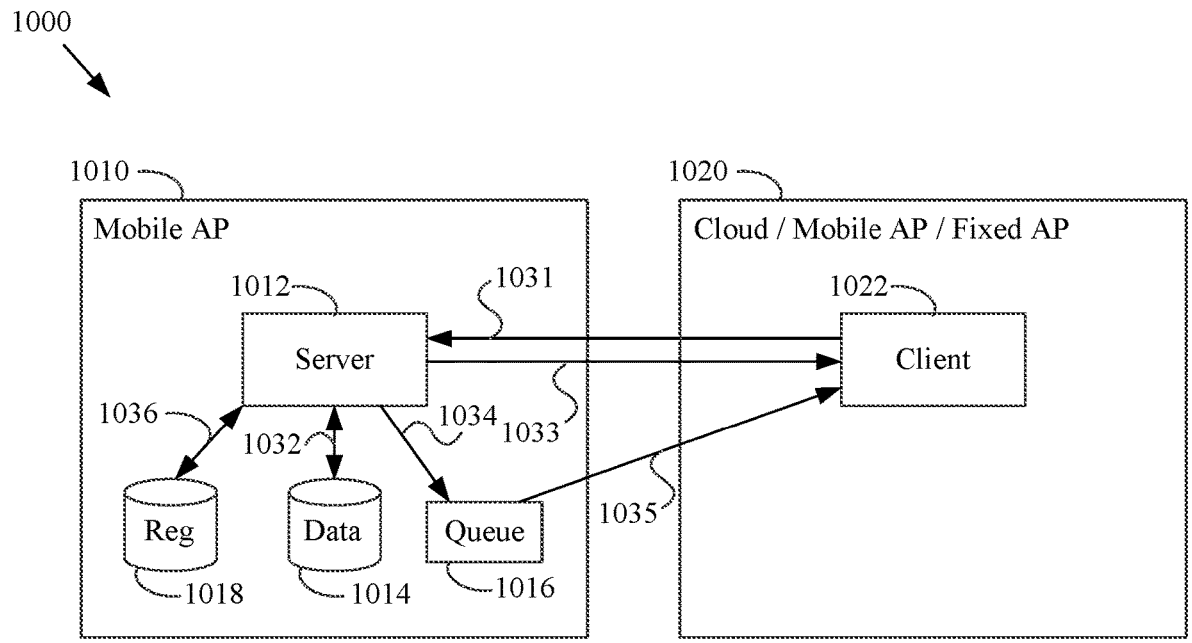
FIG. 10 shows various aspects of an example system and method for pull-based data transfer, for example including a subscription-based operation and real-time and delay-tolerant networking, through a vehicle communication network, in accordance with various aspects of the present disclosure.

FIG. 10 shows various aspects of an example system and method for pull-based data transfer, for example including a subscription-based operation and real-time and delay-tolerant networking, through a vehicle communication network, in accordance with various aspects of the present disclosure. The example system and method of FIG. 10 may, for example, share any or all characteristics with the other example networks (and/or network components) and methods (and/or method steps) 100, 200, 300, 400, 500-570, 600, 700, 800, 900, 1100, 1200, 1300, 1400, and 1500, discussed herein.

The example implementation 1000 shown in FIG. 10 shares many aspects with the example implementation 900 shown in FIG. 9 (and/or the example implementation shown in FIG. 8). For example, the Mobile AP 1010 and other node 1020 of FIG. 10 may share any or all characteristics with the Mobile AP 910 and other node 920 of FIG. 9 (and/or with the Mobile AP 810 and other node 820 of FIG. 8). For example, the Server module 1012, database 1014, Queue 1016, and Client module 1022 of FIG. 10 may share any or all characteristics with the Server module 912, database 914, Queue 916, and Client module 922 of FIG. 9 (and/or with the Server module 822, database 814, and database 814 of FIG. 8). Also for example, the request 1031, response 1033, and response 1035 of FIG. 10 may share any or all characteristics with the request 931, response 933, and response 935 of FIG. 9 (and/or with the request 831 and response 833 of FIG. 8).

In the example implementation 1000, the Server module 1012 of the Mobile AP 1010 provides access to a number of data topics that are available for subscription as well as a subscriber Registry module 1018 (e.g., stored in a non-transitory or non-volatile memory, stored in volatile memory, etc.). To subscribe, the Client module 1022 sends a message 1031 via the control mechanism to register with the Server module 1012. The message 1031 may, for example, specify the data topic of interest, specify the desired date rate, specify the urgency or priority of the data, specify the manner in which the data is to be communicated, specify the destination for the data, etc. The Server module 1012 then may, for example, register the Client module 1022 in the subscriber Registry 1018 (e.g., via an internal communication link 1036 or message) as a subscriber to the requested data (or data topic). As discussed in other example implementations, the Mobile AP 1010 may then send the requested data immediately (or synchronously) in real-time, opportunistically (asynchronously) in a delay tolerant manner, etc., as appropriate (e.g., as indicated by the message 1031, as determined based on any of a variety of communication rules of the Server 1012, etc.). The message 1031 may specify the data topic in any of a variety of manners (e.g., specified by index, by enumerated type, by URL (or URI), named strings, queries, by data source identity, etc.). Note that a system and method implemented in accordance with various aspects of this disclosure may include the utilization of different types of request messages (e.g., request messages like any or all of the request message 1031, 931, 831, etc.), and implementation of the respective responses thereto.

As discussed herein, various example implementations presented herein may comprise a hybrid solution that includes both push and pull aspects for the delivery of data. In other words, in various implementations, both push and pull data transfer strategies may concurrently (e.g., during the same general time window) or simultaneously exist. For example, various fundamental types of data (e.g., pings, network status data, system health data, etc.) may be pushed by default. Note that the rules by which such data is pushed, the identity of such data, the communication pathways utilized to push such data, etc., may be adapted during operation of the Mobile AP (e.g., upon command from any of the other nodes, upon internal recognition of various controlling events, etc.). Note that any of the example implementations shown herein may comprise both push and pull data strategies for the communication of data.

In addition to the particular data that is being pushed, for example upon request by the Client module 1022, the communication of other data may be controlled by the pull strategy discussed herein. Such data may, for example, comprise characteristics of any of the types of data discussed herein. For example, such data may comprise characteristics of high-resolution GPS location information and/or other navigation information, vehicle and/or communication system diagnostic data (e.g., OBD system data, etc.), sensor information (e.g., from sensors on-board the vehicle, from sensors off-board the vehicle, etc.), etc. Note that particular types of data may be moved from push-control to pull-control and back, for example upon receiving a message from the Client module 1022, upon expiration of a specified request duration, etc. Also note that particular types of data may be moved from real-time to DTN communication and back, for example upon receiving a message from the Client module 1022, upon expiration of a specified request duration, etc.

As mentioned herein, the rules governing push and/or pull communication of various data may be adaptable. Such adaptation may be upon direct user request, may be ultimately related to a user request, may be entirely autonomous without any relationship to a user request, etc. Such a dynamic approach provides for the adjustment or optimization of system operation in response to any of a variety of causes or conditions.

In an example implementation, context-driven algorithms may be utilized in any node (e.g., at a Mobile AP, at a Fixed AP, at a Network Controller (NC), at a Cloud server or computer, etc.). For example, data push and/or pull operation may be based, at least in part, on any of the vehicle context parameters discussed herein. For example, data push and/or pull operation may be based, at least in part, on parameters different from those parameters that exist in networks of fixed-location nodes. In other words, although the vehicle communication network environment presents new challenges for data communication, the vehicle communication network also presents new parameters that may be creatively utilized to address the new challenges.

For example, various types of data (e.g., camera and/or audio sensor data, location data, passenger health data, impact sensor data, seat belt sensor data, etc.) may be automatically pushed from vehicles upon abnormal deceleration or impact detection, for example, as determined on the vehicle side. Also for example, various types of data (e.g., slippage sensor data, location and/or velocity information, camera information, temperature information, precipitation sensor information, etc.) may be automatically pulled from vehicles in various traffic or weather contexts, as determined on the Cloud or infrastructure side.

Also, in an example implementation, the manner in which data is pulled and/or pushed may be determined based, at least in part, on a dynamic cost function. Such a cost function may, for example, account for the actual costs (e.g., monetary cost, time cost, bandwidth and/or network performance cost, etc.) of data transmission over the various possible communication links. The dynamic cost function could further be used by Machine Learning (ML) algorithms to decide when and how to apply push versus pull requests, when and how to modify the push/pull rules, etc. An example of such an implementation is provided at FIG. 11.

Figure 11:
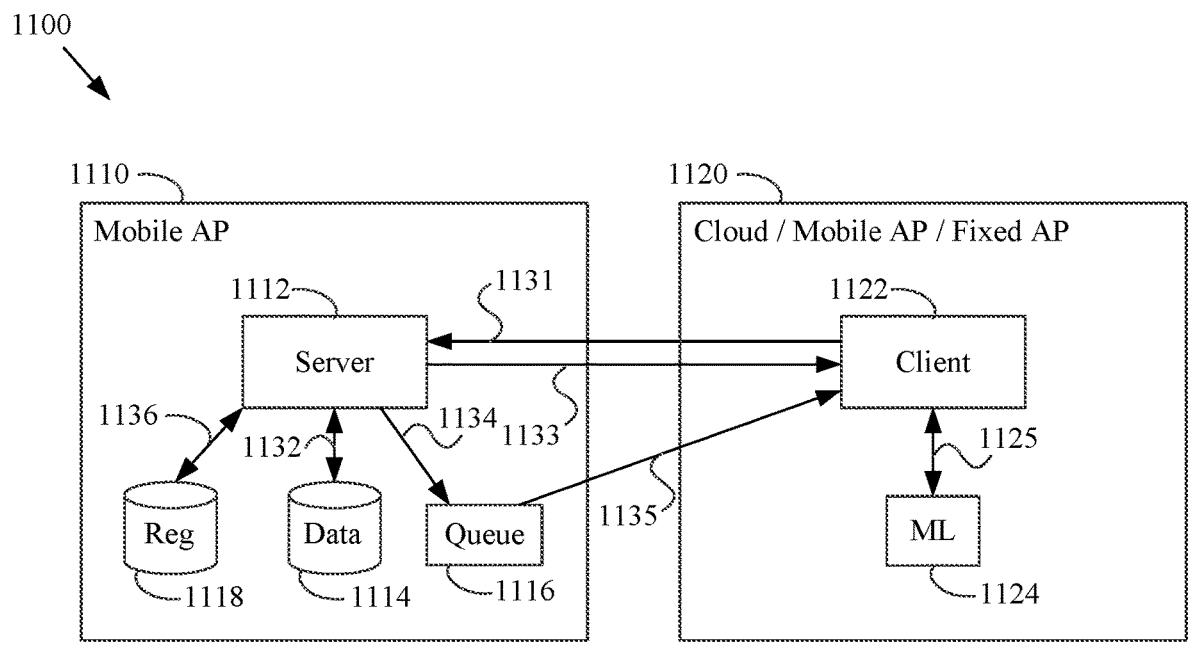
FIG. 11 shows various aspects of an example system and method for pull-based data transfer, for example including an adaptive subscription-based operation and real-time and delay-tolerant networking, through a vehicle communication network, in accordance with various aspects of the present disclosure.

FIG. 11 shows various aspects of an example system and method for pull-based data transfer, for example including an adaptive subscription-based operation and real-time and delay-tolerant networking, through a vehicle communication network, in accordance with various aspects of the present disclosure. The example system and method of FIG. 11 may, for example, share any or all characteristics with the other example networks (and/or network components) and methods (and/or method steps) 100, 200, 300, 400, 500-570, 600, 700, 800, 900, 1000, 1200, 1300, 1400, and 1500, discussed herein.

The example implementation 1100 shown in FIG. 11 shares many aspects with the example implementation 1000 shown in FIG. 10 (and/or the example implementations 900 and 800 of FIGS. 9 and 8). For example, the Mobile AP 1110 and other node 1120 of FIG. 11 may share any or all characteristics with the Mobile AP 1010 and other node 1020 of FIG. 10 (and/or generally analogous nodes of FIGS. 9 and 8). For example, the Server module 1112, database 1114, queue 1116, Registry module 1118, and Client module 1122 of FIG. 11 may share any or all characteristics with the Server module 1012, database 1014, queue 1016, Registry module 1018, and Client module 1022 of FIG. 10 (and/or generally analogous components of FIGS. 9 and 8). Also for example, the request message 1131, response message 1133, and response message 1135 of FIG. 11 may share any or all characteristics with the request message 1031, response message 1033, and response message 1035 of FIG. 10 (and/or generally analogous messages FIGS. 9 and 8).

The example other node 1120 comprises a Machine Learning module 1124 that, as discussed herein, operates to adapt the pull and/or push strategy based on dynamic cost function analysis. For example, as the costs discussed herein are observed to change, the Machine Learning module 1124 may select the best (or best combination) of various available push and pull strategies and/or may refine the operation rules of the selected push or pull strategy based on current and/or predicted cost (e.g., predicted based on historical patterns, predicted based on advance information of anticipated changes, etc.). In an example scenario, it may be learned that a cost of using a particular communication link during a particular time window and/or during a particular amount of network activity may be prohibitively high (or may about to become prohibitively high), while the cost may be acceptable during other times and/or during a period of relatively low network activity (or utilization). In such an example scenario, the Machine Learning module 1124 may adapt a selected communication pathway (at least during a particular time window) to the lower cost pathway.

Various examples have been presented herein in the context of particular types of nodes (e.g., Mobile AP nodes, other nodes, etc.). Such example nodes have been presented for illustrative convenience and are not limiting. For example, any of the example aspects presented herein with regard to a Mobile AP may be included in any other node (e.g., a Fixed AP node, a Network Controller node, a Cloud node, etc.). Also for example, any of the example aspects presented herein with regard to a node other than a Mobile AP node may be included in a Mobile AP node.

Various aspects of the present disclosure may also be demonstrated graphically in a flow diagram form. It should be noted that the flow diagrams shown herein (along with all diagrams shown herein) are merely example illustrations and do not limit the scope of this disclosure.

Figure 12:
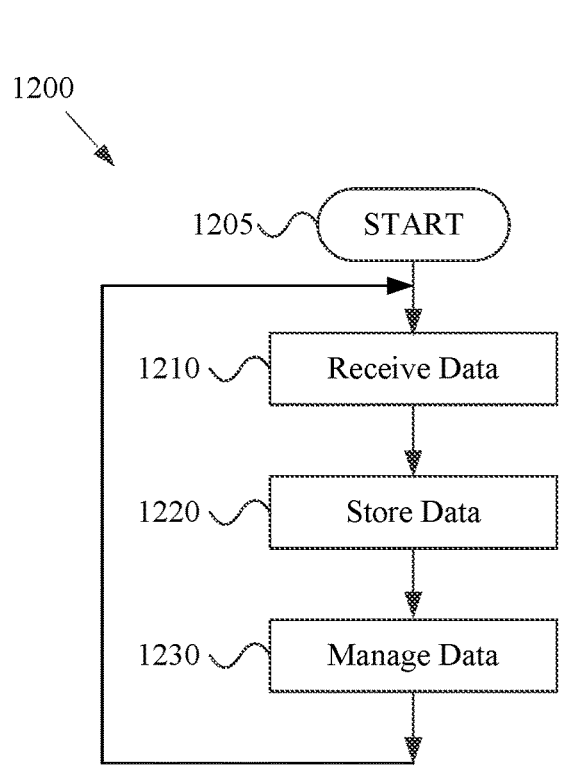
FIG. 12 shows a flow diagram of a method for efficiently operating a database, for example in a mobile access point of a vehicle communication network, in accordance with various aspects of the present disclosure.

FIG. 12 shows a flow diagram of a method for efficiently operating a database, for example in a mobile access point of a vehicle communication network, in accordance with various aspects of the present disclosure. The example method 1200 of FIG. 12 may, for example, share any or all characteristics with the other example networks (and/or network components) and methods (and/or method steps) 100, 200, 300, 400, 500-570, 600, 700, 800, 900, 1000, 1100, 1300, 1400, and 1500, discussed herein.

The example method 1200 may, for example, be implemented in a Mobile AP (or MAP), but the scope of this disclosure is not limited thereto.

For example, the Mobile AP may, at block 1210, receive data to be communicated. The Mobile AP may, for example at block 1210, receive data to be communicated (e.g., using a push strategy, using a pull strategy, using a hybrid push/pull strategy, etc.). As discussed herein, the data may be received by the Mobile AP from any of a variety of sources (e.g., user devices, vehicle systems, vehicle navigation systems, vehicle OBD systems, sensors on-board and/or off-board the vehicle, from other Mobile APs, etc.). The data may be received in an unsolicited manner, for example asynchronously sent to the Mobile AP by a data source (e.g., any of the data sources discussed herein, etc.), or may be received in a solicited manner, for example synchronously in response to the Mobile AP requesting the data from a data source (e.g., any of the data sources discussed herein, etc.).

At block 1220, the Mobile AP stores the received data in a database (e.g., any of the databases discussed herein, etc.), for example at least until the circumstances occur to trigger the communication of the received data. Note that such storage may, for example, be performed in an outgoing buffer for immediate communication and/or in a queue buffer for delay tolerant communication and/or in another buffer for only wired (or tethered) communication when the Mobile AP (or a vehicle thereof) has ended its route or shift. At block 1230, the Mobile AP manages the stored data. For example, based on any of a variety of data retention strategies, stale data should be removed to keep from overloading the finite memory of the Mobile AP. For example, data storage rules may be defined which govern the removal of data from storage. Some data may, for example, be removed when communicated or successfully communicated a single time (or some finite number of times), some data might only be removed at expiration of a time window, some data might only be removed with storage for new data is needed, some data might only be removed when a message is received that indicates that such data is no longer needed, etc.

The example method 1200 may then continue to operate, for example while the Mobile AP is powered up, while the Mobile AP is actively operating, etc. Note that the example method 1200 may operate independently of other methods that govern the pull (and/or push) delivery of the data.

Note that the example method 1200, or any of the methods discussed herein, may be performed concurrently (e.g., in a time-shared manner), simultaneously, etc. Also note that although the example methods are shown separately, execution flow from any block of any method discussed herein may proceed to any block of any other method discussed herein.

Figure 13:
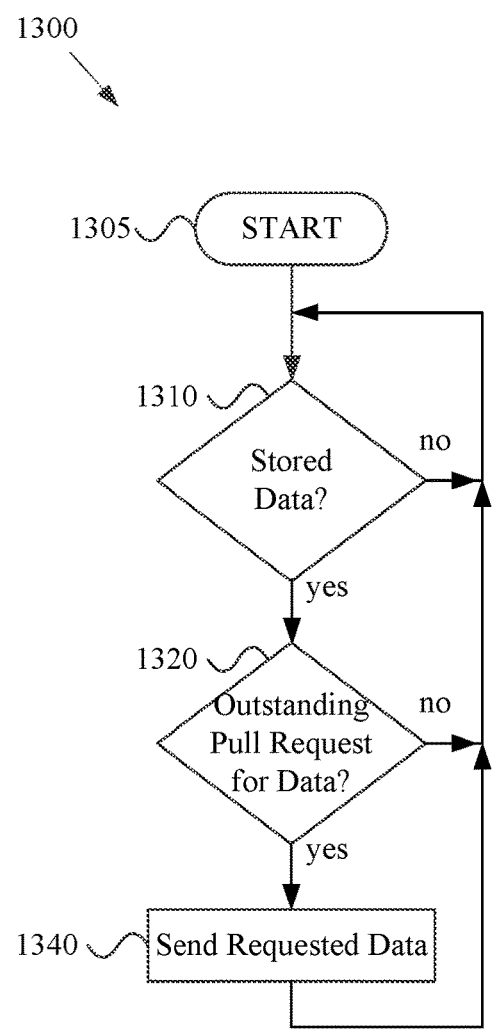
FIG. 13 shows a flow diagram of a method for controlling communication of stored data, for example in a mobile access point of a vehicle communication network, in accordance with various aspects of the present disclosure.

FIG. 13 shows a flow diagram of a method for controlling communication of stored data, for example in a mobile access point of a vehicle communication network, in accordance with various aspects of the present disclosure. The example method of FIG. 13 may, for example, share any or all characteristics with the other example networks (and/or network components) and methods (and/or method steps) 100, 200, 300, 400, 500-570, 600, 700, 800, 900, 1000, 1100, 1200, 1400, and 1500, discussed herein.

The example method 1300 (or any portion thereof) may, for example, be implemented in a Mobile AP, but the scope of this disclosure is not limited thereto.

At block 1310, a determination is made whether there is any data to communicate. If not, then flow of the example method 1300 returns to block 1310 to wait for data. If there is data stored (e.g., for communication to other nodes), then flow of the example method 1300 proceeds to block 1320 at which the Mobile AP determines whether there is an outstanding pull request for any of the available data. As discussed herein, such a request may take the form of an immediate query, a subscription, etc.

Note that the determination at block 1310 may comprise determining whether the Mobile AP has received data in response to a data solicitation initiated by the Mobile AP. For example, as discussed herein, upon receipt of a pull request for data, the Mobile AP may send a request to the source of the requested data (e.g., to a sensor, to a vehicle OBD system, to a vehicle navigation system, to a sensor external to the vehicle by which the vehicle is passing, to another Mobile AP that possesses or can acquire the desired data, to a user device, etc.).

If there is no outstanding request for the data, then execution flow of the example method 1300 returns to wait for data and/or a pull request for such data. If at block 1320, the Mobile AP determines that there is an outstanding pull request for the data, then execution flow of the example method 1300 proceeds to block 1340, at which the Mobile AP sends the data to the appropriate destination(s). Note that, at this point, unless the rules indicate that the data is to remain stored, block 1340 may comprise removing the sent data from storage. Also note that as discussed herein, another processes, for example the example method 1200 of FIG. 12 may also be running, which manages the storage and/or removal of data from storage.

Figure 14:
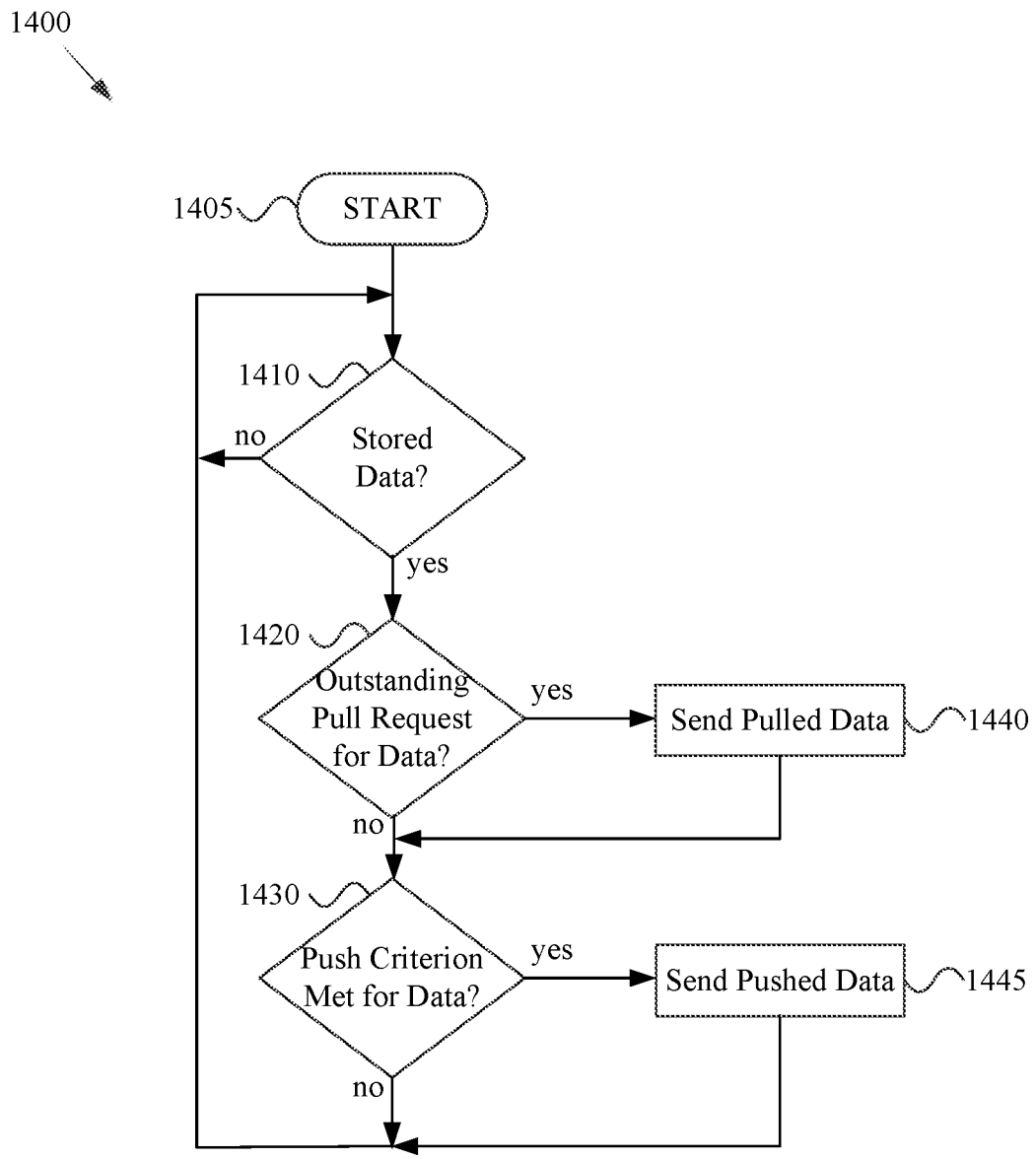
FIG. 14 shows a flow diagram of a method for controlling communication of stored data, for example in a mobile access point of a vehicle communication network, in accordance with various aspects of the present disclosure.

FIG. 14 shows a flow diagram of a method for controlling communication of stored data, for example in a mobile access point of a vehicle communication network, in accordance with various aspects of the present disclosure. The example method 1400 of FIG. 14 may, for example, share any or all characteristics with the other example networks (and/or network components) and methods (and/or method steps) 100, 200, 300, 400, 500-570, 600, 700, 800, 900, 1000, 1100, 1200, 1300, and 1500, discussed herein.

The example method 1400 (or any portion thereof) may, for example, be implemented in a Mobile AP, but the scope of this disclosure is not limited thereto. In an example implementation, a Mobile AP may perform any or all of the aspects of the example method 1400 while performing any or all of the Mobile AP functionality discussed herein, for example providing WLAN services to users within communication range of the Mobile AP, harvesting sensor data from sensors by which the Mobile AP passes, communicating with vehicle navigation systems and/or OBD systems, communicating with traffic monitoring and/or control systems, communicating with weather monitoring systems, communicating with road condition monitoring systems, etc.

Compared to the example method 1300 of FIG. 13, the example method 1400 sends the data in accordance with both pull and push strategies. For example, block 1410 may share any or all characteristics with block 1310. Also for example, blocks 1420 and 1440 may share any or all characteristics with blocks 1320 and 1340, respectively. For example, if it is determined at block 1420 that the Mobile AP has data that corresponds to a pull request, then at block 1440, the Mobile AP sends such data (e.g., in a request response, etc.), for example in a real-time or delay-tolerant (or opportunistic) manner, depending on the rules specified by the request for such data. Also for example, if it is determined at block 1430 that the Mobile AP has data that meets the criteria for push transmission of the data, then at block 1445, the Mobile AP sends such data (e.g., in an unsolicited data transmission). As discussed herein, it should be understood that the rules governing the pull and push operation may be adapted at any point, for example in response to a message received by the Mobile AP, in response to a context determination made by the Mobile AP, etc.

Though not explicitly shown in the example flow diagrams of FIGS. 12-14, upon receiving a pull request for data, the Mobile AP may actively participate in the acquisition of such data. For example, instead of (or in addition to) passively receiving and transferring data, the Mobile AP may communicate with the source of the desired data to acquire such data. For example, if a request arrives for vehicle diagnostic data, the Mobile AP may communicate with the OBD system, navigation system, etc. of the vehicle to solicit such data. Also for example, if a request arrives for vehicle audio and/or video sensor data, the Mobile AP may communicate with such vehicle sensors to solicit such data. Additionally for example, if a request arrives for current vehicle position and/or velocity data, the Mobile AP may communicate with a vehicle (or Mobile AP) navigational system to solicit such data. Further for example, if a request arrives for data from a user device (e.g., a user smartphone, smart watch, health monitor, etc.) that is communicatively coupled to the Mobile AP, the Mobile AP may communicate a request to the user device for the requested data.

Figure 15:
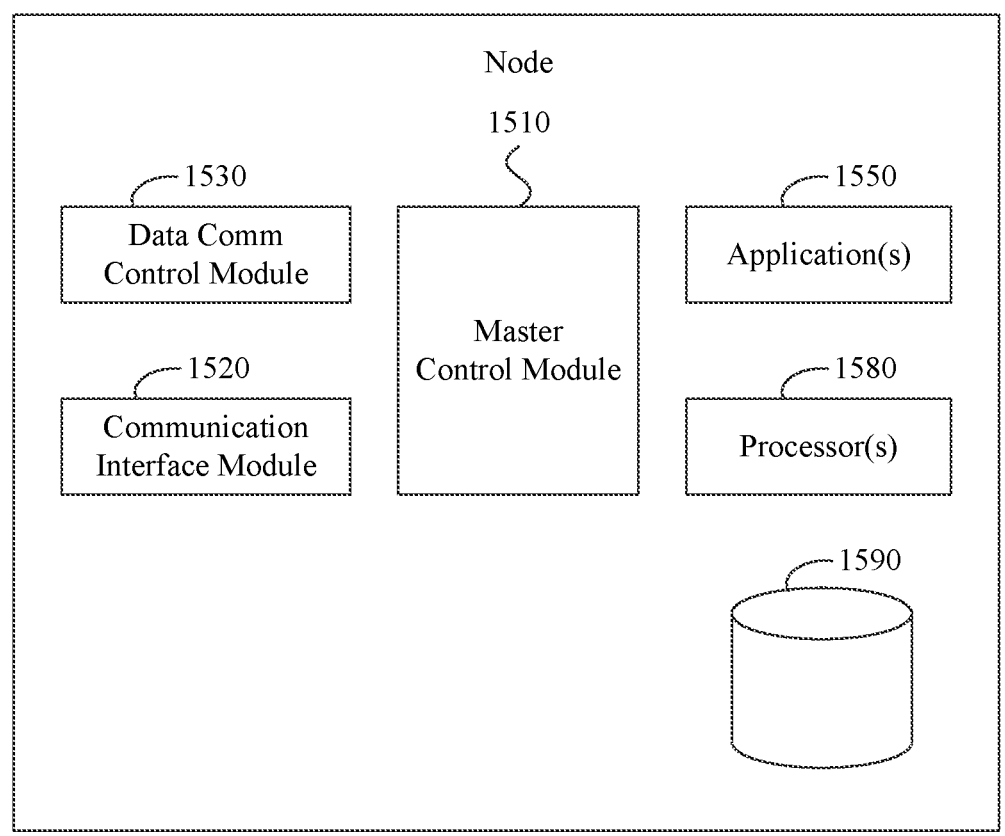
FIG. 15 shows a block diagram of various components of an example network node, in accordance with various aspects of the present disclosure.

FIG. 15 shows a block diagram of various components of an example network node, in accordance with various aspects of the present disclosure. The example node of FIG. 15 may, for example, share any or all characteristics with the other example networks (and/or network components) and methods (and/or method steps) 100, 200, 300, 400, 500-570, 600, 700, 800, 900, 1000, 1100, 1200, 1300, and 1400, discussed herein.

The example node 1500 may, for example, be any of the nodes discussed herein (e.g., a Mobile AP node, a Fixed AP node, a Network Controller node, a Cloud node, etc.). The example node 1500 may comprise a variety of components (or modules), non-limiting examples of which are provided herein.

The example node 1500 may, for example, comprise a communication interface (I/F) module 1520 (e.g., including a cellular communication interface module, mobile network communication interface module, Wi-Fi communication interface module, user/client communication interface module, etc.) that operates to perform any or all of the wireless and/or wired communication functionality for the node 1500, many examples of which are provided herein (e.g., communication with sensors external to (or of) the node 1500, communication with the onboard diagnostic (OBD) system of a vehicle in which the node 1500 is installed, communication with peer nodes, communication with Mobile APs and/or Fixed APs, communication with Network Controllers, communication with client devices, backhaul communication, Cloud server communication, etc.). The communication interface (I/F) module 1520 may, for example, operate in accordance with any of a variety of cellular communication protocols, 3G, 4G, LTE, wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), TCP/IP, etc.

The example node 1500 may, for example, comprise a Data Communication Control Module (DCCM) 1530 that operates to perform any or all of the data communication control functionality (e.g., data receiving, data storing, data storage managing, data queuing, data request or response messaging, pull communication, push communication, rule adapting, etc.) discussed herein. The example DCCM 1530 may, for example, comprise hardware and/or software that operate to implement any or all of the node's DCCM functionality discussed herein. For example, the DCCM 1530 may operate to perform any or all of the functionality discussed herein with regard to FIGS. 7-14 (e.g., Server module functionality, database functionality, queuing functionality, publishing and/or subscription functionality, Client module functionality, etc.).

The example node 1500 may, for example, comprise a Master Control Module 1510 that generally manages operation of the node 1500 at a high level. Such Master Control Module 1510 may, for example, comprise various aspects of an operating system for the node 1500.

The example node 1500 may further, for example, comprise one or more applications 1550 executing on the node 1500 (e.g., data communication applications, data storage and/or retrieval application, database management applications, subscription management applications, push and/or pull determination applications, communication applications, machine learning applications, etc.). Any or all of the applications may, for example, utilize (e.g., communicate with) the DCCM 1530 for any or all of the data communication control functionality discussed herein.

The example node 1500 may also comprise one or more processors 1580 and memory devices 1590. The processor(s) 1580 may, for example, comprise any of a variety of processor characteristics. For example, the processor(s) 1580 may comprise one or more of a general purpose processor, RIS processor, microcontroller, ASIC, DSP, video processor, etc.). The memory device(s) 1590 may, for example comprise any of a variety of memory characteristics. For example, the memory device(s) 1590 may comprise a volatile memory, non-volatile memory, etc. The memory device(s) 1590 may, for example, comprise a non-transitory computer-readable (or machine-readable) medium that comprises software instructions that when executed by the processor(s) 1580, cause the node 1500 (or modules or entities thereof) to perform any or all of the functionality discussed herein (e.g., with regard to the example methods discussed herein, etc.). The memory device(s) 1590 may, for example, store node information (e.g., neighbor node information, Wi-Fi hotspot list information, NIB information, configurable cost function information, port control information, port operational model information, historical port operation information, port invoicing information, point vehicle control information, etc.). The memory device(s) 1590 may also, for example, store any or all of the data, client subscription, push/pull rule information, etc., discussed herein.

As explained herein, the functionality (e.g., DCCM functionality, etc.) discussed herein may be performed in a single node, for example any or all of the nodes discussed herein, but may also be performed in a distributed manner in which respective portions of the functionality discussed herein are performed by respective nodes.

A system implemented in accordance with various aspects of this disclosure provides many benefits. For example, the "pull" strategy is generally based on the principle that no data should be sent unless explicitly requested. In other words, in the case of no requests, the network should be completely quiescent. This allows the scalability of the network to be based on the actual volume of data consumed, rather than the volume of data produced. Also, this allows performance optimizations, such as caching, to be designed around actual real-world data consumption patterns. Finally, such operation enables or enhances deployment beyond traditional vehicles, to more resource-constrained environments such as drones.

A system implemented in accordance with various aspects of this disclosure may be advantageously utilized in any of a variety of contexts. For example, in a first use example, a Network Operations Center (NOC) application may be utilized which depicts a visual representation of the state of a vehicular network. An operator of the NOC may wish to zoom into a specific geographic region, perhaps to view higher-resolution details. In response to such a zoom (e.g., as implemented at a Graphical User Interface (GUI)), the NOC application may send a data request to any entities operating in the zoomed area (e.g., Mobile APs, Fixed APs, integrated user devices, autonomous vehicle control systems, etc.), and the requested devices may then respond with the requested data (e.g., with only the requested data, with the requested data in combination with various pushed data, etc.).

In another example implementation, an automotive diagnostic system (e.g., a human or machine-based technician), for example for individually-operated cars for a fleet of autonomous vehicles, etc., may request more detailed information (e.g., such as event logs or sensor data) from a specific vehicle for a defined time window (or duration). The diagnostic program may then send a data request to which the Mobile AP should respond with the requested data during the requested time duration. The Mobile AP may also, for example if specifically instructed, communicate the requested data in a specified manner.

In yet another example implementation, traffic information and/or various sensor data may be shared in a vehicle-to-vehicle (V2V) basis. For example, a Mobile AP may broadcast a request for data to nearby vehicles, sharing its intended heading or route. The nearby vehicles would then respond only with data relevant to the request.

In any of a variety of operational scenarios (e.g., V2V scenarios, Vehicle-to-Infrastructure (V2I) scenarios, etc.), privacy may be an important consideration. In such scenarios, various secure communication techniques may be incorporated into the pull and/or push strategies. For example, encryption may be incorporated, trusted entity signatures may be exchanged, etc. For example, depending on the privacy level of various data being requested by a Client, the Server may require the completion of different respective secure communication techniques.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, and U.S. patent application Ser. No. 15/245,992, titled "Systems and Methods for Shipping Management in a Network of Moving Things," filed Aug. 26, 2016, each of which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting and/or effectively utilizing a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network, or one or more nodes thereof, implemented in accordance with various aspects of the present disclosure provide for controlling data transfer through a network of moving things in a manner that reduces unnecessarily utilization of communication bandwidth and/or financial resources.

While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A Mobile Access Point (MAP) of a vehicle communication network, the MAP comprising:
    at least one communication circuit; and
    at least one module comprising a processor and memory, the at least one module configured to, at least:
        utilize the at least one communication circuit to receive first data;
        store the first data in the memory;
        manage the storing of the first data based on a predefined storage policy, wherein the predefined storage policy defines one or more conditions for removing of the first data;
        utilize the at least one communication circuit to receive second data;
        in response to reception of a first message from a second node, the first message comprising first information identifying the first data, and second information indicating a manner in which the first data is to be communicated:
            determine if the first data is still stored in the memory; and
            when the first data is still available, utilize the at least one communication circuit to communicate the first data, in accordance with the manner indicated in the second information of the first message; and
        manage communication of the received second data based on one or both of: application of dynamic cost function and one or more context parameters.

2. The Mobile Access Point (MAP) of claim 1, wherein the at least one module is configured to utilize the at least one communication circuit to request the first data in response to the first message.

3. The Mobile Access Point (MAP) of claim 1, wherein the second information comprises information indicating whether the MAP is to communicate the first data immediately or in a delay-tolerant manner.

4. The Mobile Access Point (MAP) of claim 1, wherein the at least one module is configured to:
    if the second information indicates that the MAP is to communicate the first data immediately, then store the first data in a first queue for immediate communication of the first data; and
    if the second information indicates that the MAP is to communicate the first data in a delay-tolerant manner, then store the first data in a second queue for delay-tolerant communication of the first data.

5. The Mobile Access Point (MAP) of claim 1, wherein:
    the second information comprises information indicating that the first data is to be communicated to a destination node different from the second node; and
    based at least in part of the second information, the at least one module is configured to utilize the at least one communication circuit to communicate the first data to the destination node different from the second node.

6. The Mobile Access Point (MAP) of claim 1, wherein the at least one module is configured to:
    utilize the at least one communication circuit to receive the first message via a first communication network; and
    utilize the at least one communication circuit to communicate the first data via a second communication network different from the first communication network.

7. The Mobile Access Point (MAP) of claim 6, wherein the first communication network comprises a cellular communication network, and the second communication network comprises the vehicle communication network.

8. The Mobile Access Point (MAP) of claim 1, wherein the first message comprises information indicating conditions under which the MAP is to communicate the first data.

9. The Mobile Access Point (MAP) of claim 1, wherein the at least one module is configured to utilize the at least one communication circuit to:
receive second data; and
communicate the second data in an asynchronous manner.

10. The Mobile Access Point (MAP) of claim 9, wherein the at least one module is configured to utilize the at least one communication circuit to communicate the first data in a synchronous manner.

11. The Mobile Access Point (MAP) of claim 1, wherein the at least one module is configured to, in response to the first message, store subscription information for the first data in a registry.

12. A Mobile Access Point (MAP) of a vehicle communication network, the MAP comprising:
at least one communication circuit; and
at least one module comprising a processor and memory, the at least one module configured to, at least:
receive first data from the vehicle and/or one or more sensors;
store the first data in the memory;
manage the storing of the first data based on a predefined storage policy, wherein the predefined storage policy defines one or more conditions for removing of the first data;
receive second data from the vehicle and/or one or more sensors;
in response to reception of a first message and a second message from a second node, handle the first data and the second data based on one or both of the first message and the second message, wherein the handling comprises:
determining if the first data is still stored in the memory;
when the first data is still available, and based at least in part on the first message:
utilizing the at least one communication circuit to immediately communicate the first data, wherein the first data is communicated based on a manner indicated in the first message; and
manage communication of the first data based on one or both of: application of dynamic cost function and one or more context parameters; and
based at least in part on the second message, storing the second data in a buffer for delay tolerant communication of the second data.

13. The Mobile Access Point (MAP) of claim 12, wherein the at least one module is configured to utilize the at least one communication circuit to:
receive third data from the vehicle and/or one or more sensors; and
communicate the received third data in an asynchronous manner.

14. The Mobile Access Point (MAP) of claim 12, wherein the at least one module is configured to utilize the at least one communication circuit to:
receive the first message via a first communication network; and
immediately communicate the first data over a second communication network different from the first communication network.

15. The Mobile Access Point (MAP) of claim 14, wherein the first communication network comprises a cellular communication network, and the second communication network comprises the vehicle communication network.

16. The Mobile Access Point (MAP) of claim 12, wherein:
the first message specifies a communication network through which the first data is to be communicated; and/or
the second message specifies a communication network through which the second data is to be communicated.

17. The Mobile Access Point (MAP) of claim 12, wherein:
the first message comprises information indicating a duration during which the first data is to be communicated; and/or
the second message comprises information indicating a duration during which the second data is to be communicated.

18. The Mobile Access Point (MAP) of claim 12, wherein:
the first message comprises information indicating a destination node for the first data that is different from the second node; and/or
the second message comprises information indicating a destination node for the second data that is different from the second node.

19. The Mobile Access Point (MAP) of claim 12, wherein the at least one module is configured to, in response to the first message, store subscription information for the first data in a registry.

20. A Mobile Access Point (MAP) of a vehicle communication network, the MAP comprising:
at least one communication circuit; and
at least one module comprising a processor and memory, the at least one module configured to, at least:
utilize the at least one communication circuit to receive data from a communication network of the vehicle and/or one or more sensor devices;
store the received data in the memory;
manage the storing of the received data based on a predefined storage policy, the predefined storage policy setting one or more conditions for removing of the received data; and
manage communication of the received data based on one or both of: application of dynamic cost function and one or more context parameters, wherein the managing comprises:
determining whether a pull request has been registered for the received data; and
when a pull request has been registered for the received data:
determining if the received data is still stored in the memory; and
when the received data is still available, communicating the received data in accordance with the pull request.

21. The Mobile Access Point (MAP) of claim 20, wherein the at least one module is configured to:
utilize the at least one communication circuit to receive a message from a second node, the message comprising the pull request; and
register the pull request in response to the message.

22. The Mobile Access Point (MAP) of claim 20, wherein the at least one module is configured to:
determine whether push criteria have been met for the received data; and when the push criteria have been met for the received data, then communicate the received data.

23. The Mobile Access Point (MAP) of claim 20, wherein the at least one module is configured to utilize the at least one communication circuit to:
   receive second data from the communication network of the vehicle and/or one or more sensor devices; and
   communicate the received second data to a destination node asynchronously.

24. The Mobile Access Point (MAP) of claim 22, wherein the at least one module is configured to receive a message from a second node, the message comprising information indicating the push criteria.

* * * * *